(12) United States Patent
Isaka et al.

(10) Patent No.: US 9,937,678 B2
(45) Date of Patent: Apr. 10, 2018

(54) METHOD FOR MANUFACTURING MOTORCYCLE TIRE

(71) Applicant: SUMITOMO RUBBER INDUSTRIES LTD., Kobe-shi (JP)

(72) Inventors: Wataru Isaka, Kobe (JP); Masafumi Otani, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 181 days.

(21) Appl. No.: 14/667,822

(22) Filed: Mar. 25, 2015

(65) Prior Publication Data

US 2015/0273777 A1    Oct. 1, 2015

(30) Foreign Application Priority Data

Mar. 25, 2014   (JP) .................................. 2014-062422

(51) Int. Cl.
*B29D 30/36* (2006.01)
*B29D 30/08* (2006.01)
(Continued)

(52) U.S. Cl.
CPC ......... *B29D 30/08* (2013.01); *B29D 30/1628* (2013.01); *B29D 30/242* (2013.01);
(Continued)

(58) Field of Classification Search
CPC .. B29D 30/16; B29D 30/1607; B29D 30/246; B29D 30/3264; B29D 30/36; B29D 2030/3264; B29D 30/17
See application file for complete search history.

(56) References Cited

U.S. PATENT DOCUMENTS 2,045,545 A * 6/1936 Shook .................... B29D 30/12
152/543
2,814,331 A * 11/1957 Vanzo .................. B29D 30/245
156/123
(Continued)

FOREIGN PATENT DOCUMENTS

JP           53-3479  *  1/1978  ............. B29H 17/02
JP       2003-118011  *  4/2003  ............. B29D 30/24
(Continued)

OTHER PUBLICATIONS

Machine generated English language translation of JP 2007-76182 (original document dated Mar. 2007).*
(Continued)

*Primary Examiner* — Martin K Rogers
(74) *Attorney, Agent, or Firm* — Oblon, McClelland, Maier & Neustadt, L.L.P.

(57) ABSTRACT

A method for manufacturing a motorcycle tire includes forming a cylindrical raw tire body including a carcass body including a carcass ply and bead cores on the carcass ply, and forming a cylindrical belt ply wound in a cylindrical shape. The forming of the belt ply includes filling the tire body to expand to first expanded phase, winding a sheet-type belt ply by extending the sheet-type belt ply on bell rings to form the cylindrical belt ply with inner surface bonded to the apex of the tire body, filling the tire body to expand the apex of the tire body along with the belt ply to second expanded phase, increasing diameter of an expandable profile deck to expand the apex of the tire body along with the belt ply to third expanded phase, and winding down edges of the belt ply to bond the belt ply to the tire body.

20 Claims, 5 Drawing Sheets (S2-1)

(51) Int. Cl.
 *B29D 30/16* (2006.01)
 *B29D 30/24* (2006.01)
 *B29D 30/70* (2006.01)
 *B32B 1/08* (2006.01)
 *B32B 25/02* (2006.01)
 *B32B 25/04* (2006.01)
 *B32B 37/00* (2006.01)
 *B32B 37/02* (2006.01)
 *B32B 38/00* (2006.01)
 *B29K 305/12* (2006.01)

(52) U.S. Cl.
 CPC .............. *B29D 30/36* (2013.01); *B29D 30/70* (2013.01); *B32B 1/08* (2013.01); *B32B 25/02* (2013.01); *B32B 25/04* (2013.01); *B32B 37/0046* (2013.01); *B32B 37/02* (2013.01); *B32B 38/0012* (2013.01); *B29D 2030/082* (2013.01); *B29K 2277/10* (2013.01); *B29K 2305/12* (2013.01); *B32B 2038/0028* (2013.01); *B32B 2262/0269* (2013.01); *B32B 2262/103* (2013.01); *B32B 2305/08* (2013.01); *B32B 2309/08* (2013.01); *B32B 2597/00* (2013.01)

(56) References Cited

U.S. PATENT DOCUMENTS

| | | | | |
|---|---|---|---|---|
| 4,528,052 | A * | 7/1985 | Yoshie | B29D 30/70 156/117 |
| 5,441,093 | A * | 8/1995 | Shirasyouji | B60C 9/2204 152/454 |
| 2007/0194497 | A1* | 8/2007 | Fukasawa | B29C 35/02 264/326 |
| 2007/0251630 | A1* | 11/2007 | Marchini | B29D 30/0005 156/130.5 |
| 2012/0067476 | A1* | 3/2012 | Imhoff | B29B 15/08 152/209.1 |

FOREIGN PATENT DOCUMENTS

| | | | |
|---|---|---|---|
| JP | 2005-212278 A | 8/2005 | |
| JP | 2007-76182 | * 3/2007 | ............ B29D 30/36 |
| JP | 2007-076182 A | 3/2007 | |

OTHER PUBLICATIONS

Machine generated English language translation of JP 2003-118011 (original document dated Apr. 2003).*

Machine generated English language translation of JP 53-3479 (orginial document dated Jan. 1978).*

* cited by examiner

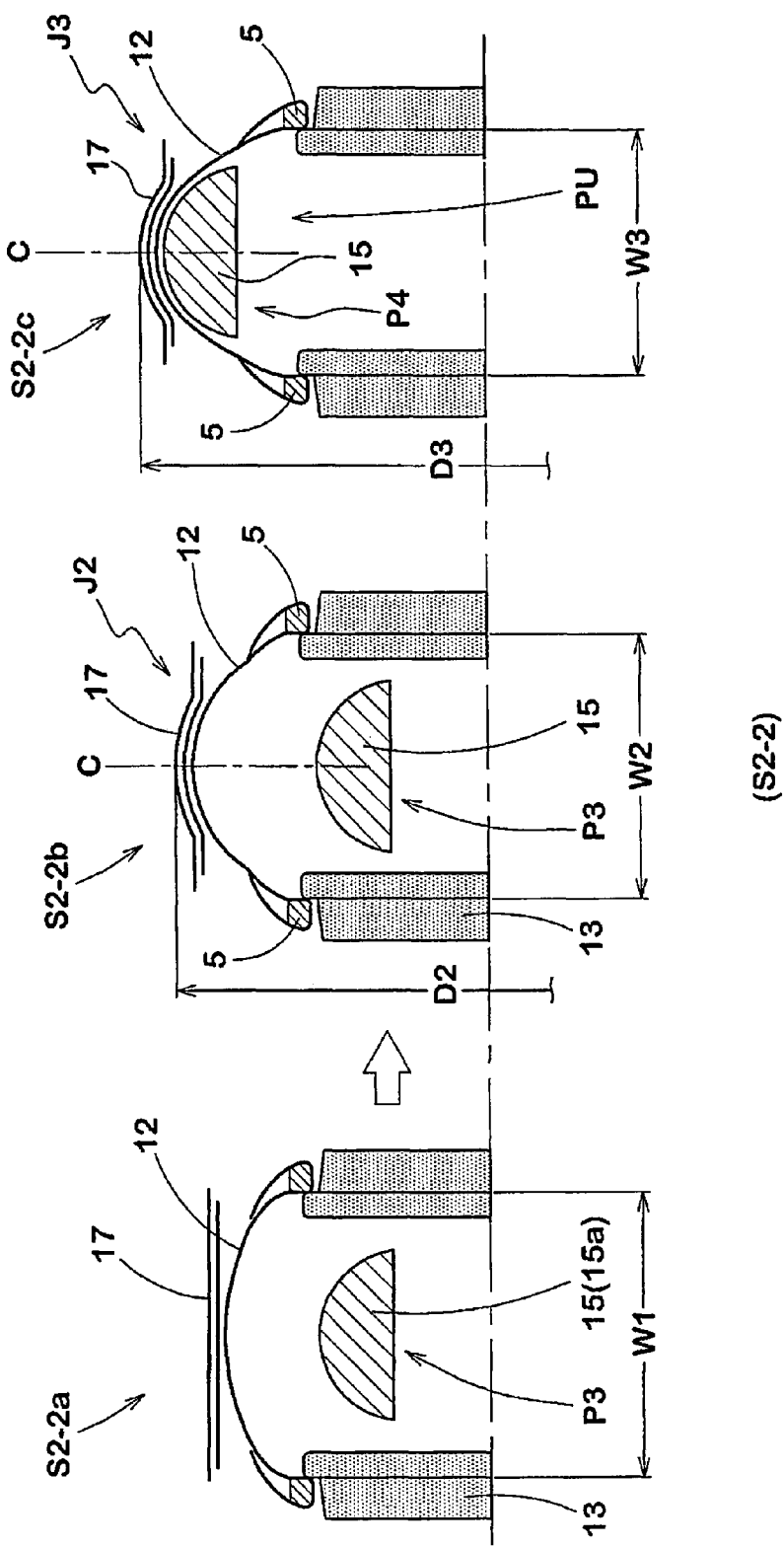

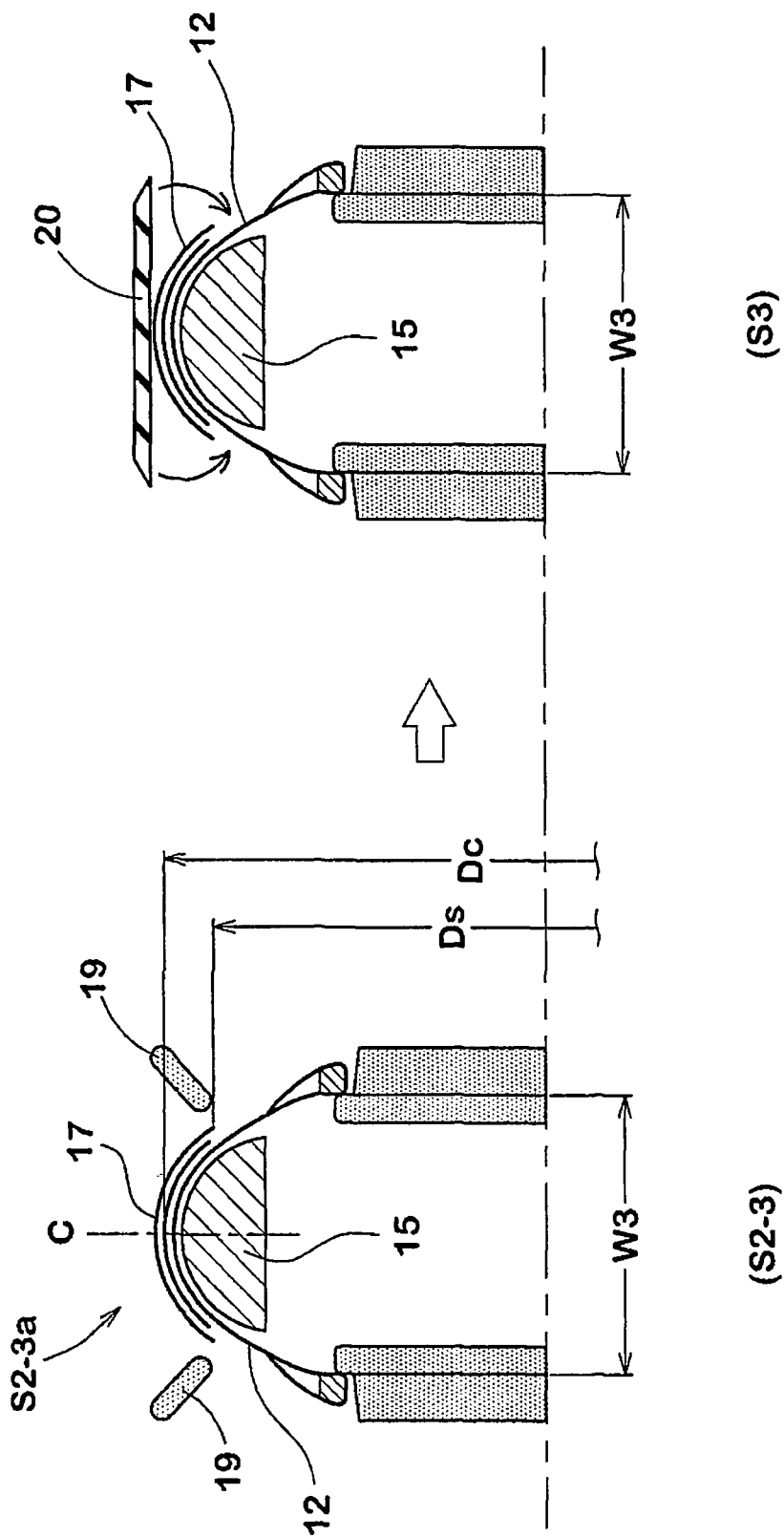

METHOD FOR MANUFACTURING MOTORCYCLE TIRE

CROSS-REFERENCE TO RELATED APPLICATIONS

The present application is based upon and claims the benefit of priority to Japanese Patent Application No. 2014-062422, filed Mar. 25, 2014, the entire contents of which are incorporated herein by reference.

BACKGROUND OF THE INVENTION

Field of the Invention

The present invention relates to a method for manufacturing a motorcycle tire with enhanced uniformity obtained by keeping belt cords from meandering.

Description of Background Art

For example, JP2007-76182A describes a manufacturing method as follows: When a cylindrical belt ply is bonded to a raw tire body expanded in a toroidal shape, the cylindrical belt ply and the raw tire body are expanded in a radially outward direction by applying inflation pressure to the raw tire body while reducing the distance between bead cores so that the belt ply abuts the raw tire body from the tire equator all the way to both of the tire outer edges. In addition, JP2005-212278A describes a manufacturing method as follows: an arc-shaped profile deck divided into multiple segments in a peripheral direction protrudes from the inner circumferential surface of a cylindrical belt ply in the radially outward direction so as to shape a belt ply in a curved profile. The entire contents of these publications are incorporated herein by reference.

SUMMARY OF THE INVENTION

According to one aspect of the present invention, a method for manufacturing a motorcycle tire includes forming a cylindrical raw tire body including a cylindrical carcass body including a sheet-type carcass ply of a carcass wound to be cylindrical and bead cores positioned on edges of the sheet-type carcass ply, and forming a cylindrical belt ply wound in a cylindrical shape. The forming of the cylindrical belt ply includes moving a pair of cylindrical bell rings for a distance toward both sides of a tire in axial directions with a tire equatorial plane set as a center of movement and positioned on an outside of the cylindrical raw tire body to be concentric with the tire such that the pair of cylindrical bell rings moves from a standby position on an axially outer side toward an axially inner side of the tire and leaves a gap in between, filling the cylindrical raw tire body at a first inflation pressure while reducing a distance between the bead cores to a first distance such that an apex of the cylindrical raw tire body protrudes in a radially outward direction through the gap left between the bell rings and that the cylindrical raw tire body is expanded in a toroidal shape to a first expanded phase, winding a sheet-type belt ply by extending the sheet-type belt ply on the pair of bell rings such that the cylindrical belt ply is formed with an inner circumferential surface of the cylindrical belt ply bonded to the apex of the cylindrical raw tire body, filling the cylindrical raw tire body at a second inflation pressure that is higher than the first inflation pressure after the bell rings are returned to the standby position while reducing the distance between the bead cores to a second distance that is smaller than the first distance such that the apex of the cylindrical raw tire body is expanded along with the cylindrical belt ply from the first expanded phase to a second expanded phase, increasing a diameter of an expandable profile deck from a standby position on a radially inner side to a radially outer expanded position of the cylindrical raw tire body while reducing the distance between the bead cores to a third distance that is smaller than the second distance such that the apex of the cylindrical raw tire body is expanded along with the cylindrical belt ply from the second expanded phase to a third expanded phase, and winding down edges of the cylindrical belt ply such that the cylindrical belt ply is bonded to the cylindrical raw tire body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows views schematically illustrating a belt-ply forming process subsequent to the process shown in FIG. 3; and FIG. 5 shows views schematically illustrating a belt-ply forming process and a tread forming process subsequent to the process shown in FIG. 4.

DETAILED DESCRIPTION OF THE EMBODIMENTS

Figure 1:
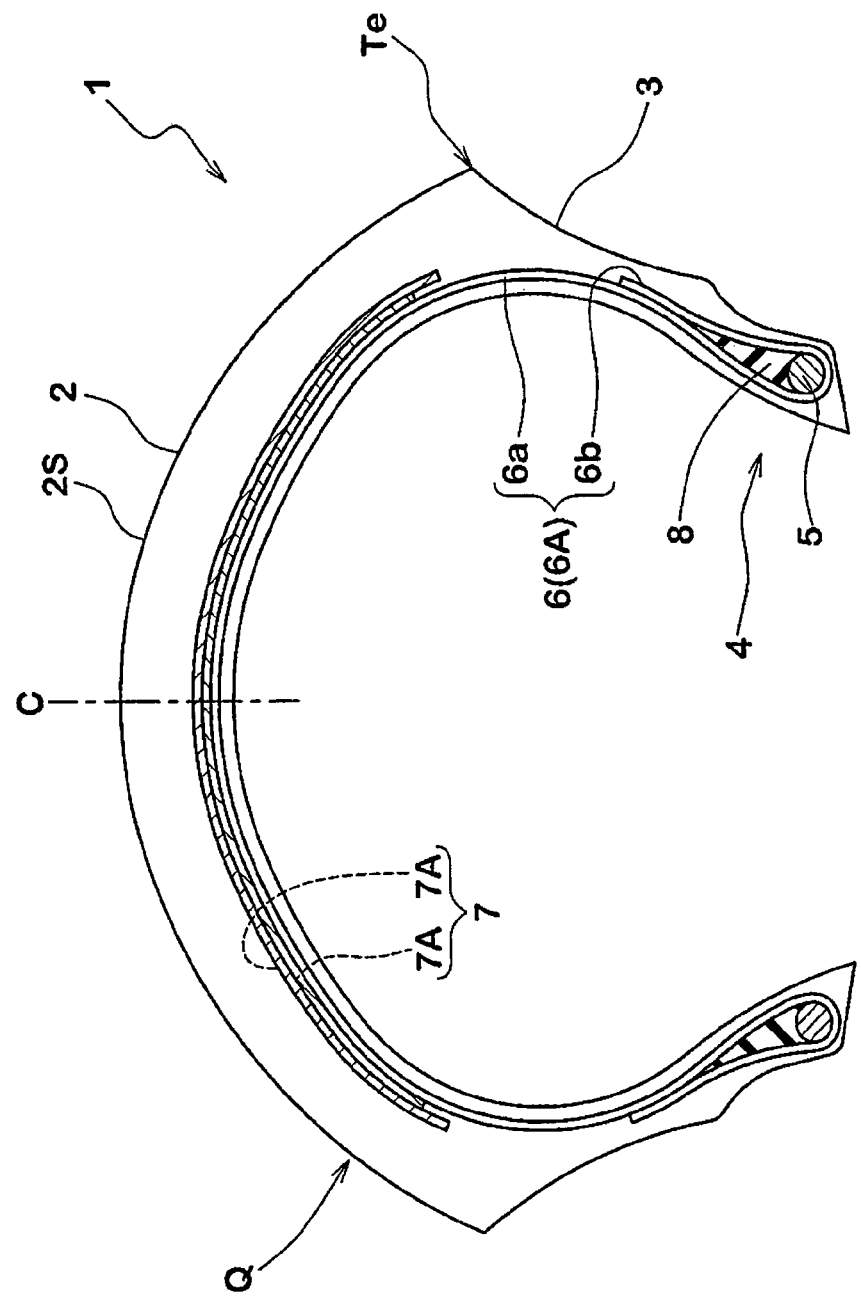
FIG. 1 is a cross-sectional view showing a motorcycle tire formed according to an embodiment of the present invention.

The embodiments will now be described with reference to the accompanying drawings, wherein like reference numerals designate corresponding or identical elements throughout the various drawings.

As shown in FIG. 1, motorcycle tire 1 formed by the manufacturing method of the present embodiment is provided with carcass 6 extending from tread section 2 through sidewall 3 to reach bead core 5 in bead section 4, and belt layer 7 positioned on the radially outer side of carcass 6 and on the inner side of tread section 2.

Tread (2S) that is the outer surface of tread section 2 extends from tire equatorial plane (C) toward tread edges (Te) in a convex arc shape. In addition, the tread width measured between tread edges (Te, Te) is the tire maximum width in an axial direction, thus allowing the motorcycle to bank significantly when turning in a manner characteristic of motorcycles.

Carcass 6 is made of one or more carcass plies (6A) formed by arranging carcass cords in an angle range of 65~90 degrees with respect to a tire circumferential direction. In the present embodiment, carcass 6 is provided with one carcass ply (6A). Examples of carcass cords are preferred to be organic fiber cords such as nylon, polyester and rayon. In carcass ply (6A), on both ends of ply main body (6a) extended between bead cores (5, 5), ply turn-up portion (6b) is formed continuously from the main body to turn up around bead core 5 from the tire axially inner side toward the outer side and to be locked therein. Between ply main body (6a) and ply turn-up portion (6b), bead apex rubber 8 for reinforcing the bead is provided, tapering from bead core 5 in the tire radially outer direction.

Belt layer 7 is made up of 2~3 belt plies (7A) formed by arranging belt cords in an angle range of 10~40 degrees with respect to a tire circumferential direction. In the present embodiment, belt layer 7 is provided with two belt plies (7A). Inclination directions of belt cords in belt plies (7A) are set opposite so that belt cords intersect each other when belt plies (7A) are laminated in a radial direction. Organic fiber cords such as aramid, nylon and rayon, especially aramid fiber cords, are preferred for belt cords, but steel cords may also be used. When steel cords or aramid fibers are used, belt ply (7A) exhibits significant binding force, and thereby further suppresses deformation in tread section 2.

If applicable, a band layer (not shown) is formed on the tire radially outer side of belt layer 7. A band layer is made up of one or more band plies formed by winding band cords helically in a tire circumferential direction, for example. Such a band layer suppresses tread section 2 from lifting during high-speed rotations, while enhancing the rigidity of tread section 2 in a circumferential direction. As a result, durability and steering stability are enhanced during high-speed running.

In the following, a method for manufacturing a motorcycle tire is described according to an embodiment of the present invention. The manufacturing method of the present embodiment includes a raw-tire-body forming process and a vulcanization process to vulcanize the raw tire formed in the raw-tire-body forming process so that motorcycle tire 1 is obtained. The vulcanization may be conducted by any conventional vulcanization process. Thus, a description of such a process is omitted in the present application.

As shown schematically in FIG. 2-5, a raw-tire-body forming process includes a raw-tire-body forming process (S1), a belt-ply forming process (S2), and a tread forming process (S3).

Figure 2:
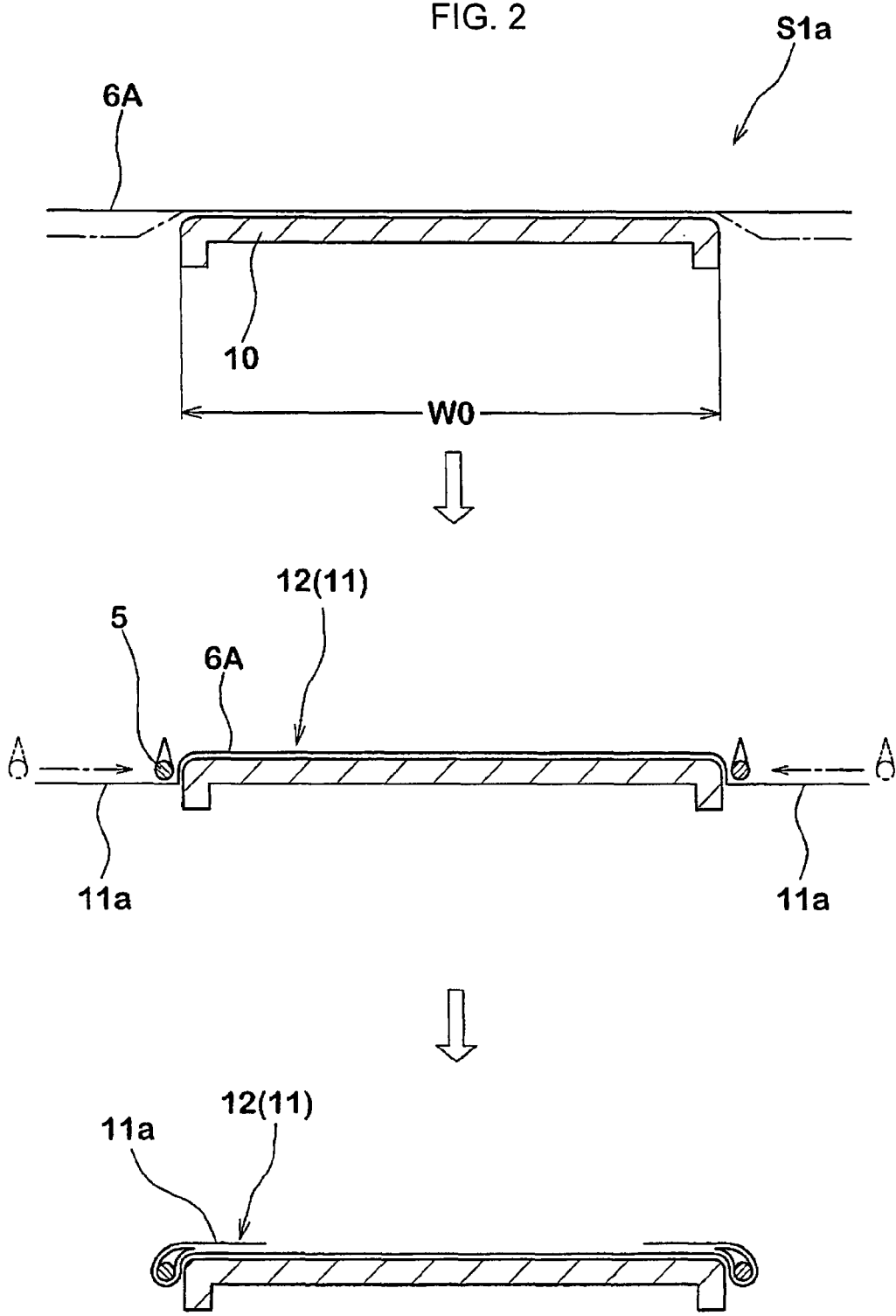
FIG. 2 shows views schematically illustrating a raw-tire-body forming process.

FIG. 2 shows raw-tire-body forming process (S1). Any conventional method may be employed for raw-tire-body forming process (S1). A sheet-type carcass ply (6A) is wound in a circumferential direction of a raw tire on a cylindrical molding drum 10, and bead core 5 is provided for each of both end portions. Accordingly, cylindrical raw tire body 12 which includes cylindrical carcass body 11 is formed. The present embodiment shows an example where cylindrical carcass body 11 is formed to have each end portion (11a) turned up around bead core 5 and locked therein.

Width (W0) of molding drum 10 is set based on the profile of vulcanized motorcycle tire 1. In raw tire body 12, members such as an inner-liner rubber, sidewall rubber, clinch rubber and the like are laminated on cylindrical carcass body 11 where applicable.

Figure 3:
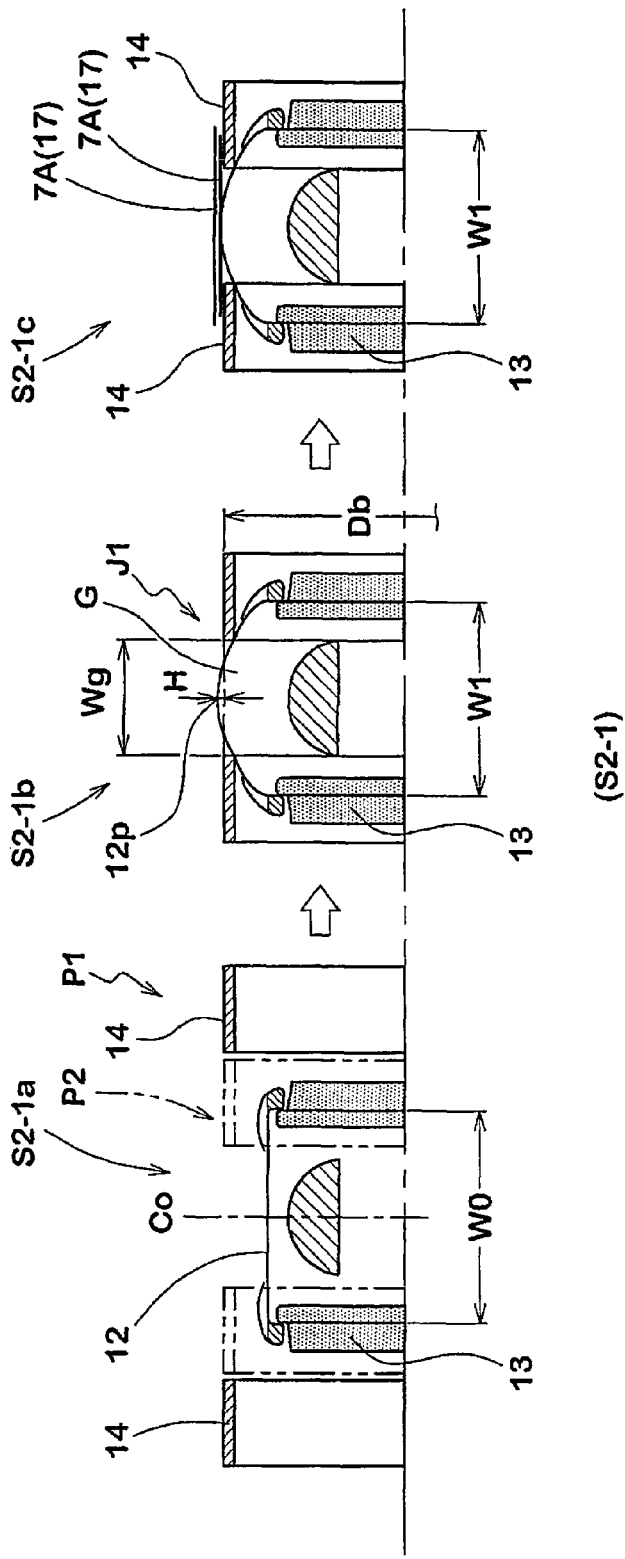
FIG. 3 shows views schematically illustrating a belt-ply forming process.

Raw tire body 12 is removed from molding drum 10 by decreasing the diameter of molding drum 10. Then, raw tire body 12 is transferred to a pair of shaping drums (13, 13) (so-called second formers) as shown in FIGS. 3 to 5. Next, first belt-ply forming process (S2-1), second belt-ply forming process (S2-2), and third belt-ply forming process (S2-3) are conducted in that order. Paired shaping drums (13, 13) each support the bead of raw tire body 12, and are movable for a short distance toward both sides of the tire in axial directions with the tire equatorial plane set as the center of movement.

FIG. 3 shows first belt-ply forming process (S2-1) and raw-tire-body forming process (S1a). In first belt-ply forming process (S2-1), a cylindrical belt ply 17 is obtained by winding a sheet-type belt ply (7A) in a cylindrical shape to be concentric with raw tire body 12 as shown in FIG. 3. More specifically, first belt-ply forming process (S2-1) includes bell-ring closing step (S2-1a), first expansion step (S2-1b) and winding step (S2-1c).

In bell-ring closing step (S2-1a), the distance between shaping drums (13, 13), namely, the distance between a pair of bead cores (5, 5), is set to be equal to width (W0) of molding drum 10, for example.

Next, in bell-ring closing step (S2-1a), a pair of cylindrical bell rings 14 concentric with shaping drums 13 are used. Paired bell rings 14 are supported to be movable for a short distance toward both sides of the tire in axial directions with the tire equatorial plane set as the center of movement.

Paired bell rings (14, 14) are positioned in standby positions (P1) on the axially outer side of the tire. When bell-ring closing step (S2-1a) is initiated, paired bell rings 14 move from standby positions (P1) on the axially outer side toward close-in positions (P2) on the axially inner side of the tire. The width of gap (G) between paired bell rings (14, 14) in close-in positions (P2), namely, distance (Wg) between paired bell rings (14, 14), is preferred to be in a range of 50~100 mm, for example.

When above distance (Wg) is less than 50 mm, height (H) of apex (12p) of raw tire body 12 protruding through gap (G) is insufficient in first expansion step (S2-1b). As a result, belt ply (7A) will not bond well with raw tire body 12 in winding step (S2-1c).

On the other hand, when above distance (Wg) exceeds 100 mm, height (H) of apex (12p) of raw tire body 12 protruding through gap (G) is too great in first expansion step (S2-1b). Accordingly, belt ply (7A) does not abut bell rings (14, 14) sufficiently in winding step (S2-1c), and accuracy in the winding process of belt ply (7A) may decrease.

In first expansion step (S2-1b), the distance between bead cores (5, 5) is reduced to first distance (W1) that is smaller than above width (W0), while raw tire body 12 is filled at a first inflation pressure. Accordingly, raw tire body 12 expands in the radially outward direction, causing the external peripheral surface of raw tire body 12 to abut the inner circumferential surface of bell rings (14, 14). Moreover, raw tire body 12 keeps expanding until its apex (12p) protrudes in a radially outward direction through gap (G) between bell rings (14, 14) to have height (H) in a toroidal shape. At that time, the state of raw tire body 12 and cylindrical belt ply 17 is referred to as first expanded phase (J1). In first expanded phase (J1), height (H) of apex (12p) of raw tire body 12 is preferred to protrude by 5~30 mm, for example, from the outer peripheral surface of bell rings (14, 14).

When the protrusion of height (H) of apex (12p) of raw tire body 12 is less than 5 mm, belt ply (7A) and raw tire body 12 will bond sufficiently in the winding step (S2-1c). On the other hand, when the above protrusion of height (H) exceeds 30 mm, belt ply (7A) does not sufficiently abut bell rings (14, 14) in winding step (S2-1c). Thus, accuracy in winding belt ply (7A) may be lowered.

First distance (W1) between bead cores (5, 5) and first inflation pressure in raw tire body 12 in first expansion step (S2-1b) are maintained until first expansion step (S2-2b) starts in second belt-ply forming process (S2-2) shown in FIG. 4.

In winding step (S2-1c) subsequent to first expansion step (S2-1b), sheet-type belt ply (7A) is wound by being extended on bell rings (14, 14). Accordingly, cylindrical belt ply 17 is formed with its inner circumferential surface bonded to apex (12p) of raw tire body 12.

If cylindrical belt ply 17 is first formed by being extended between bell rings (14, 14), and then raw tire body 12 is expanded outward by inflation pressure, raw tire body 12 makes contact with cylindrical belt ply 17 during an unstable phase of the expansion process. Thus, the positional accuracy of cylindrical belt ply 17 with respect to raw tire body 12 may be reduced. Therefore, in first belt-ply forming process (S2-1), first expansion step (S2-1b) is preferred to be conducted first, followed by winding step (S2-1c).

As shown in FIG. 4, in second belt-ply forming process (S2-2), raw tire body 12 is further expanded in the radially outward direction so that cylindrical belt ply 17 and raw tire body 12 will be bonded in a wider range. More specifically, second belt-ply forming process (S2-2) includes bell-ring opening step (S2-2a), second expansion step (S2-2b) and third expansion step (S2-2c).

In bell-ring opening step (S2-2a), paired bell rings 14 move to standby positions (P1) (see FIG. 3). Accordingly, raw tire body 12 and paired bell rings 14 are released from abutting, allowing raw tire body 12 to further expand in a radially outward direction.

In second expansion step (S2-2b), the distance between bead cores (5, 5) is reduced to second distance (W2) that is smaller than first distance (W1), while raw tire body 12 is filled at a second inflation pressure that is higher than the first inflation pressure. Accordingly, raw tire body 12 expands in a radially outward direction. The state of raw tire body 12 and cylindrical belt ply 17 at that time is referred to as second expanded phase (J2). Since uniform tensile force is exerted on the carcass ply when the raw tire body is filled at the second inflation pressure in second expansion step (S2-2b), angles of belt cords in the raw tire are maintained uniformly in a tire circumferential direction.

The second inflation pressure is preferred to be 150~300 kPa. When the second inflation pressure is lower than 150 kPa, raw tire body 12 and cylindrical belt ply 17 may not expand sufficiently in second expanded phase (J2). When the second inflation pressure exceeds 300 kPa, raw tire body 12 and cylindrical belt ply 17 may expand excessively in second expanded phase (J2).

The duration required for second expansion step (S2-2b), namely, the time needed to increase pressure from the first inflation pressure to the second inflation pressure, is preferred to be 10~30 seconds. If the pressure boosting time is shorter than 10 seconds, raw tire body 12 and cylindrical belt ply 17 may not expand sufficiently in second expanded phase (J2). On the other hand, if the pressure boosting time exceeds 30 seconds, productivity of raw tires may decrease.

It is an option for raw tire body 12 to be filled at a second inflation pressure by simply filling the tire with air, or by filling air using a bladder provided on the radially inner side of the tire. Using the latter method, even when the rubber thickness, for example, the thickness of the inner-liner rubber, on the inner circumferential side of carcass ply (6A) is reduced, a second inflation pressure may be applied at a level necessary to maintain second expanded phase (J2) of raw tire body 12 and cylindrical belt ply 17. As a result, both light weight and uniformity are achieved in the tire.

In third expansion step (S2-2c) following second expansion step (S2-2b), expandable profile deck 15 is used. Profile deck 15 is positioned to be concentric with shaping drums 13, and they are formed to be rotatable to synchronize at the same rotation speed.

Profile deck 15 is formed to have the same structure as that described in JP2005-212278A above, and has an external shape similar to the outline of the tire cavity of motorcycle tire 1. More specifically, profile deck 15 is formed to include multiple elements (15a) divided in a circumferential direction. When each element (15a) moves in a radially inner or outer direction by using a known expandable mechanism (not shown) such as a link mechanism or a cylinder, profile deck 15 enlarges or reduces its diameter.

In third expansion step (S2-2c), the distance between bead cores (5, 5) is reduced to third distance (W3) that is smaller than second distance (W2), while profile deck 15 enlarges its diameter from standby position (P3) on the radially inner side of raw tire body 12 toward radially outer expanded position (P4). Accordingly, the apex of raw tire body 12 along with cylindrical belt ply 17 expands in the radially outward direction. The state of raw tire body 12 and cylindrical belt ply 17 is referred to as third expanded phase (J3).

In third expansion step (S2-2c), the inflation pressure of raw tire body 12 is reduced to its surrounding ambient pressure, for example, after profile deck 15 has enlarged its diameter to radially outer expanded position (P4).

In the present embodiment, raw tire body 12 and cylindrical belt ply 17 are expanded in two steps, that is, filling the raw tire body at a second inflation pressure in second expansion step (S2-2b) followed by enlarging the diameter of profile deck 15 in third expansion step (S2-2c). Accordingly, even when steel or aramid fibers with strong binding force are used for belt cords, it is not necessary to exert strong drive force to enlarge the diameter of profile deck 15.

The same as the manufacturing method described in JP2007-76182A above, since raw tire body 12 is expanded by filling it at the second inflation pressure in second expansion step (S2-2b), the profile of a raw tire in second expanded phase (J2) tends to be different from the profile of a vulcanization die. However, in the present embodiment, the profile of a raw tire is corrected to a shape approximating that of the vulcanization die when profile deck 15 enlarges its diameter in third expansion step (S2-2c). Accordingly, the rubber or belt cords are unlikely to move in the vulcanization die, thereby resulting in improved uniformity.

Meanwhile, the same as the manufacturing method described in JP2005-212278A above, because of the diameter enlarging mechanism of profile deck 15 used for expanding raw tire 12, angles of belt cords tend to vary unevenly in a tire circumferential direction in third expansion step (S2-2c). However, in the present embodiment, because raw tire body 12 and cylindrical belt ply 17 have been expanded in second expansion step (S2-2b), the degree of expansion during third expansion step (S2-2c) is lower. Moreover, since circumferentially uniform expansion has been already achieved in second expansion step (S2-2b) as a result of the raw tire body being filled at the second inflation pressure, the angle variations of belt cords are limited in third expansion step (S2-2c). Therefore, uneven angles of belt cords in a tire circumferential direction are suppressed when profile deck 15 enlarges its diameter. Accordingly, uniformity is improved.

As shown in FIG. 5, in third belt-ply forming process (S2-3), raw tire body 12 and cylindrical belt ply 17 are completely bonded. Furthermore, in tread forming process (S3), a tread rubber is formed on the radially outer side of cylindrical belt ply 17.

Third belt-ply forming process (S2-3) includes belt bonding step (S2-3a). In belt bonding step (S2-3a), while the inner circumferential surface of raw tire body 12 is supported by profile deck 15, both edges of cylindrical belt ply 17 are wound down to be bonded to the raw tire body 12 expanded in a toroidal shape. Both edges are wound down when stitch rollers 19 are pressed continuously along the outer peripheral surface of cylindrical belt ply 17 from the equator toward the axially outer side, while shaping drums 13 and profile deck 15 set to be concentric are rotated at the same rotation speed. Accordingly, cylindrical belt ply 17 is completely bonded to raw tire body 12 from the equator all the way to both edges.

After the above, a band ply is formed on the radially outer side of cylindrical belt ply 17.

In tread forming process (S3), tread rubber member 20, which is extruded and molded to have a wide belt shape with a trapezoidal cross section, is laminated on the radially outer side of cylindrical belt ply 17 to form a tread rubber. Tread rubber 20 is formed in a cylindrical shape by being wound once in a circumferential direction onto the outer circumferential surface of cylindrical belt ply 17, and is curved along cylindrical belt ply 17 by stitching downward using stitch rollers 19 or the like. Accordingly, a tread rubber is obtained.

In tread forming process (S3), a so-called strip wind method (STW method) may also be employed. In such an STW method, a tread rubber is formed by helically winding narrow tape-shaped rubber strips (not shown) continuously on cylindrical belt ply 17.

Internal diameter (Dc) on equatorial plane (C) of cylindrical belt ply 17 after belt bonding step (S2-3a) shown in FIG. 5 is conducted is greater than external diameter (Db) of the bell rings shown in FIG. 3. On the other hand, internal diameter (Ds) at the axial edge of cylindrical belt ply 17 after belt bonding step (S2-3a) shown in FIG. 5 is conducted is preferred to be smaller than external diameter (Db) of the bell rings. By so setting, even when its diameter changes, angular variations in cylindrical belt ply 17 are suppressed, and tire uniformity is enhanced.

Moreover, internal diameter (Dc), external diameter (Db) and internal diameter (Ds) above are preferred to satisfy the following relationship.

0.15≤(Db−Ds)/(Dc−Ds)≤0.45

When the above ratio (Db−Ds)/(Dc−Ds) is less than 0.15, that would cause a greater angular change in belt cords near equator (C) of a raw tire, and it is difficult to expand cylindrical belt ply 17. On the other hand, when the above ratio (Db−Ds)/(Dc−Ds) exceeds 0.45, that would cause a greater angular change in belt cords near both edges of cylindrical belt ply 17 of a raw tire. Accordingly, wrinkles may occur near both edges of cylindrical belt ply 17 and uniformity may decrease.

As shown in FIG. 4, external diameter (D2) on equator (C) of cylindrical belt ply 17 in second expanded phase (J2) and external diameter (D3) on equator (C) of cylindrical belt ply 17 in third expanded phase (J3) are preferred to have a ratio (D2/D3) in a range of 0.90~1.00.

When the above ratio (D2/D3) is smaller than 0.90, the diameter change of cylindrical belt ply 17 in third expansion step (S2-2c) increases, and that would make it harder to expand cylindrical belt ply 17. Also, since the degree of expanding cylindrical belt ply 17 by using profile deck 15 increases, angles of belt cords tend to vary unevenly in a tire circumferential direction, and uniformity may be reduced accordingly.

On the other hand, when the above ratio (D2/D3) exceeds 1.00, the effect achieved when profile deck 15 corrects the profile of a raw tire will be limited. Thus, the effort to enhance uniformity may fail.

So far, an embodiment of the present invention has been described in detail. However, the present invention is not limited to the above, and various modifications of the embodiment are possible.

EXAMPLE

Test motorcycle tires in size 120/70ZR17 with a basic structure as shown in FIG. 1 are each manufactured to have specifications in Table 1, and uniformity in each tire was measured.

To make a comparison, test motorcycle tires having the same structure as above were prepared according to the manufacturing method shown in JP2007-76182A (comparative example 1), the manufacturing method shown in JP2005-212278A (comparative example 2), and a manufacturing method of the embodiment above from which a second expansion step is omitted (comparative example 3) respectively, and uniformity in each tire was also measured.

In all the test tires, a belt layer is formed with two belt plies each prepared by arranging a 3×3 steel cord (line diameter of 0.17 mm) with a cord count of 55/50 mm at an angle of 27 degrees.

Uniformity

Twenty tires are each picked at random from the tires manufactured by their respective methods and mounted on a rim MT3.50×17 under conditions of an inflation pressure of 200 kPa and a load of 1.45 kN. Then, radial force variation (RFV), lateral force variation (LFV), radial run-out (RRO) and lateral run-out (LRO) of each tire are measured respectively. In the LRO, "LRO T" indicates the LRO in the shoulder molded in the upper die of a vertically divided die, and "LRO B" indicates the LRO in the shoulder molded in the bottom die of a vertically divided die. Measurements are conducted according to the uniformity testing method specified in "JASOC 607:2000" and the values indicate average values. The smaller the value is, the more excellent is the uniformity.

TABLE 1

|  | comp. example 1 | comp. example 2 | comp. example 3 | example 1 | example 2 | example 3 | example 4 |
|---|---|---|---|---|---|---|---|
| 1st expansion step | done | done | done | done | done | done | done |
| 2nd expansion step | done | none | none | done | done | done | done |
| 3rd expansion step | none | none | done | done | done | done | done |
| 2nd inflation pressure (kPa) | 200 | none | none | 200 | 100 | 150 | 150 |
| pressure boosting time (sec) | 20 | none | none | 20 | 5 | 10 | 30 |
| Dc (mm) | 580 | 580 | 580 | 580 | 580 | 580 | 580 |
| Db (mm) | 530 | 530 | 530 | 530 | 530 | 530 | 530 |
| Ds (mm) | 500 | 500 | 500 | 500 | 500 | 500 | 500 |
| (Db-Ds)/(Dc-Ds) | 0.38 | 0.38 | 0.38 | 0.38 | 0.38 | 0.38 | 0.38 |
| RFV (N) | 143 | 176 | 150 | 30 | 118 | 42 | 48 |
| LFV (N) | 95 | 142 | 90 | 20 | 85 | 26 | 24 |
| RRO (mm) | 1.49 | 1.82 | 1.53 | 0.35 | 1.12 | 0.49 | 0.55 |
| LRO T(mm) | 1.42 | 1.75 | 1.24 | 0.24 | 1.10 | 0.33 | 0.36 |

TABLE 1-continued

| | | | | | | | |
|---|---|---|---|---|---|---|---|
| LRO B (mm) | 1.39 | 1.80 | 1.32 | 0.26 | 1.05 | 0.37 | 0.33 |

| | example 5 | example 6 | example 7 | example 8 | example 9 | example 10 | example 11 |
|---|---|---|---|---|---|---|---|
| 1st expansion step | done | done | done | done | done | done | done |
| 2nd expansion step | done | done | done | done | done | done | done |
| 3rd expansion step | done | done | done | done | done | done | done |
| 2nd inflation pressure (kPa) | 300 | 350 | 200 | 200 | 200 | 200 | 200 |
| pressure boosting time (sec) | 30 | 40 | 20 | 20 | 20 | 20 | 20 |
| Dc (mm) | 580 | 580 | 580 | 580 | 580 | 580 | 580 |
| Db (mm) | 530 | 530 | 510 | 512 | 536 | 550 | 580 |
| Ds (mm) | 500 | 500 | 500 | 500 | 500 | 500 | 500 |
| (Db-Ds)/(Dc-Ds) | 0.38 | 0.38 | 0.38 | 0.15 | 0.45 | 0.63 | 1.00 |
| RFV (N) | 53 | 132 | 55 | 50 | 65 | 50 | 95 |
| LFV (N) | 31 | 88 | 28 | 35 | 42 | 35 | 79 |
| RRO (mm) | 0.62 | 1.46 | 0.64 | 0.59 | 0.67 | 0.59 | 1.03 |
| LRO T (mm) | 0.55 | 1.22 | 0.49 | 0.50 | 0.55 | 0.62 | 1.21 |
| LRO B (mm) | 0.59 | 1.26 | 0.44 | 0.49 | 0.57 | 0.53 | 1.15 |

| | example 12 | example 13 | example 14 | example 15 |
|---|---|---|---|---|
| 1st expansion step | done | done | done | done |
| 2nd expansion step | done | done | done | done |
| 3rd expansion step | done | done | done | done |
| 2nd inflation pressure (kPa) | 200 | 200 | 200 | 200 |
| pressure boosting time (sec) | 20 | 20 | 20 | 20 |
| Dc (mm) | 520 | 540 | 560 | 580 |
| Db (mm) | 580 | 580 | 580 | 580 |
| Ds (mm) | 0.89 | 0.93 | 0.97 | 1.00 |
| RFV (N) | 102 | 73 | 54 | 45 |
| LFV (N) | 63 | 46 | 32 | 25 |
| RRO (mm) | 1.05 | 0.82 | 0.61 | 0.49 |
| LRO T (mm) | 1.10 | 0.86 | 0.54 | 0.42 |
| LRO B (mm) | 1.08 | 0.88 | 0.51 | 0.43 |

As is clear in Table 1, it was confirmed that motorcycle tires in the examples manufactured by the method according to the embodiment showed significantly enhanced uniformity, compared with those in the comparative examples.

Since a motorcycle banks significantly at the time of cornering, the tread section of a motorcycle tire is formed to have a low, arc-shaped profile with a small curvature. When the profile of a tire tread section has a small curvature, uniformity may be lowered if the belt cords of a belt ply meander and become disarrayed. Accordingly, various manufacturing methods have been proposed for keeping belt cords from meandering.

However, using the manufacturing method in JP2007-76182A above, because of the method for expanding a raw tire by applying inflation pressure, the resultant raw tire may have a profile different from that of a vulcanizing die. In such a raw tire, the rubber or belt cords in the vulcanizing die may move significantly, causing the belt cords to meander. Accordingly, uniformity may be lowered.

Also, in the manufacturing method described in JP2005-212278A above, the profile of a belt ply is curved according to the vulcanizing die. However, the binding force of the belt ply increases when steel cords or aramid fibers are used for belt cords. Thus, it is difficult to enlarge the diameter of the profile deck to a desired degree. Even when the driving force of the profile deck is enhanced, due to the expandable mechanism of the profile deck, angles of belt cords vary unevenly in a tire circumferential direction. As a result, uniformity may be lowered the same as above.

A method for manufacturing a motorcycle tire according to an embodiment of the present invention is capable of keeping belt cords from meandering so as to enhance uniformity.

One aspect of the present invention is a method for manufacturing a motorcycle tire. The motorcycle tire has a carcass extending from the tread section through a sidewall to reach the bead core of a bead section, and a belt layer positioned on the radially outer side of the carcass and on the inner side of the tread section. The belt layer is formed with a belt ply made of multiple belt cords. Such a manufacturing method is characterized by including a raw-tire-body forming process to form a cylindrical raw tire body that contains a cylindrical carcass body in which a sheet-type carcass ply of the carcass is wound to be cylindrical, and bead cores are provided on both edges of the carcass ply; and a belt-ply forming process to form a cylindrical belt ply that is wound in a cylindrical shape.

The belt-ply-forming process includes the following steps: a bell-ring closing step to move a pair of cylindrical bell rings, which are supported to be movable for a short distance toward both sides of the tire in axial directions with the tire equatorial plane set as the center of movement and are positioned on the outside of the raw tire body to be concentric with the tire, from a standby position on the axially outer side toward the axially inner side of the tire leaving a gap in between; a first expansion step to expand the raw tire body in a toroidal shape by filling the raw tire body at a first inflation pressure, while reducing the distance between the bead cores to a first distance so that the apex of the raw tire body protrudes toward the radially outer side through the gap left between the paired bell rings; a winding step to wind a sheet-type belt ply by extending it on the pair of bell rings so as to form a cylindrical belt ply with its inner circumferential surface bonded to the apex of the raw tire body; after the paired bell rings are returned to the standby position, a second expansion step to expand the apex of the raw tire body along with the cylindrical belt ply from the first expanded phase to a second expanded phase by filling the raw tire body at a second inflation pressure that is higher than the first inflation pressure, while reducing the distance between the bead cores to a second distance that is smaller than the first distance; a third expansion step to expand the apex of the raw tire body along with the cylindrical belt ply from the second expanded phase to a third expanded phase by increasing the diameter of an expandable profile deck from a standby position on the radially inner side to a radially outer expanded position of the raw tire body, while reducing the distance between the bead cores to a third distance that is smaller than the second distance; and a belt bonding step to bond the belt ply to the raw tire body by winding down both edges of the cylindrical belt ply.

In a manufacturing method according to an embodiment of the present invention, the second inflation pressure is preferred to be 150~300 kPa.

In a manufacturing method according to an embodiment of the present invention, the time for increasing from the first inflation pressure to the second inflation pressure is preferred to be 10~30 seconds.

In a manufacturing method according to an embodiment of the present invention, the internal diameter (Dc) on the equator of the cylindrical belt ply after the belt bonding step is conducted is preferred to be greater than the external diameter (Db) of the bell rings, and the internal diameter (Ds) at an axially peripheral edge of the cylindrical belt ply after the belt bonding step is conducted is preferred to be smaller than the external diameter (Db) of the bell rings.

In a manufacturing method according to an embodiment of the present invention, the internal diameter (Dc) on the equator of the cylindrical belt ply, the external diameter (Db) of the bell rings, and the internal diameter (Ds) at an axially peripheral edge of the cylindrical belt ply are preferred to satisfy the following relationship.

$$0.15 \leq (Db-Ds)/(Dc-Ds) \leq 0.45$$

In a manufacturing method according to an embodiment of the present invention, the belt cords are made of aramid fiber or steel.

In a manufacturing method according to an embodiment of the present invention, the second inflation pressure is preferred to be filled into a bladder provided on the radially inner side of the raw tire body.

In a manufacturing method according to an embodiment of the present invention, the external diameter (D2) on the equator of the cylindrical belt ply in the second expanded phase and the external diameter (D3) on the equator of the cylindrical belt ply in the third expanded phase are preferred to have a ratio (D2/D3) in a range of 0.90~1.00.

A method for manufacturing a motorcycle tire according to an embodiment of the present invention includes a raw-tire-body forming process to form a cylindrical raw tire body and a belt-ply forming process to form a cylindrical belt ply. The belt-ply forming process includes the following steps: a bell-ring closing step to move a pair of bell rings for a short distance in the tire axially inner direction leaving a gap in between; a first expansion step to make the apex of the raw tire body protrude through the gap left between the bell rings toward the radially outer side by filling the raw tire body at a first inflation pressure; a winding step to form a cylindrical belt ply with its inner circumferential surface bonded to the apex of the raw tire body; a second expansion step to expand the apex of the raw tire body along with the cylindrical belt ply by filling the raw tire body at a second inflation pressure; a third expansion step to further expand the cylindrical belt ply and the raw tire body by enlarging the diameter of the profile deck; and a belt bonding step to bond both edges of the cylindrical belt ply to the raw tire body.

In the above manufacturing method, after the cylindrical belt ply is bonded to the apex of the raw tire body in the winding step, the cylindrical belt ply and the raw tire body are expanded in two steps—by filling the raw tire body at a second inflation pressure and by enlarging the diameter of the profile deck. Namely, by filling the raw tire body at the second inflation pressure in the second expansion step, uniform tensile force is exerted on the carcass ply. Accordingly, the angles of belt cords in the raw tire are uniform in a tire circumferential direction, and the tire uniformity is thereby improved. Then, by enlarging the diameter of the profile deck in the third expansion step, the profile of the raw tire body is corrected to approximate that of the vulcanizing die. Thus, rubber and belt cords in the vulcanizing die seldom move. As a result, the belt cords are kept from meandering during the vulcanization process, and a tire with excellent uniformity is achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a motorcycle tire, comprising:

forming a cylindrical raw tire body comprising a cylindrical carcass body including a sheet-type carcass ply of a carcass wound to be cylindrical and bead cores positioned on edges of the sheet-type carcass ply; and forming on the cylindrical raw tire body a cylindrical belt ply including a plurality of belt cords comprising aramid fiber or steel such that the cylindrical belt ply is wound in a cylindrical shape, wherein the forming of the cylindrical belt ply includes moving a pair of cylindrical bell rings for a distance toward both sides of the cylindrical raw tire body in axial directions with a tire equatorial plane set as a center of movement and positioned on an outside of the cylindrical raw tire body to be concentric with the cylindrical raw tire body such that the pair of cylindrical bell rings moves from a standby position on an axially outer side toward an axially inner side of the cylindrical raw tire body and leaves a gap in between, filling the cylindrical raw tire body at a first inflation pressure while reducing a distance between the bead cores to a first distance such that an apex of the cylindrical raw tire body protrudes from an outer peripheral surface of the bell rings in a radially outward direction through the gap left between the bell rings and that the cylindrical raw tire body is expanded in a toroidal shape to a first expanded phase, winding a sheet-type belt ply by extending the sheet-type belt ply on the outer peripheral surface of the bell rings after the filling of the cylindrical raw tire body at the first inflation pressure such that the cylindrical belt ply is formed with an inner circumferential surface of the cylindrical belt ply bonded to the apex of the cylindrical raw tire body, filling the cylindrical raw tire body at a second inflation pressure that is higher than the first inflation pressure after the bell rings are returned to the standby position while reducing the distance between the bead cores to a second distance that is smaller than the first distance such that the apex of the cylindrical raw tire body is expanded in the radially outward direction along with the cylindrical belt ply from the first expanded phase to a second expanded phase, increasing a diameter of an expandable profile deck from a standby position on a radially inner side to a radially outer expanded position of the cylindrical raw tire body while reducing the distance between the bead cores to a third distance that is smaller than the second distance after the filling of the cylindrical raw tire body at the second inflation pressure such that the apex of the cylindrical raw tire body is further expanded in the radially outward direction along with the cylindrical belt ply from the second expanded phase to a third expanded phase, and pressing down edges and pressing down edges of the cylindrical belt ply while the expandable profile deck supports the cylindrical raw tire body in the third expanded phase such that the cylindrical belt ply is bonded to the cylindrical raw tire body.

2. The method of claim 1, wherein the second inflation pressure is set in a range of 150 to 300 kPa.

3. The method of claim 1, wherein a time for increasing from the first inflation pressure to the second inflation pressure is set in a range of 10 to 30 seconds.

4. The method of claim 1, wherein the pressing down of the edges of the cylindrical belt ply includes bonding the cylindrical belt ply to the cylindrical raw tire body such that an internal diameter Dc on an equator of the cylindrical belt ply after the cylindrical belt ply is bonded to the cylindrical raw tire body by the pressing down is set greater than an external diameter Db of the bell rings, and that an internal diameter Ds at an axially peripheral edge of the cylindrical belt ply after the cylindrical belt ply is bonded to the cylindrical raw tire body by the pressing down is set smaller than the external diameter Db of the bell rings.

5. The method of claim 4, wherein the internal diameter Dc on the equator of the cylindrical belt ply, the external diameter Db of the bell rings, and the internal diameter Ds at the axially peripheral edge of the cylindrical belt ply satisfy $0.15 \leq (Db-Ds)/(Dc-Ds) \leq 0.45$.

6. The method of claim 1, wherein the cylindrical belt ply includes the plurality of belt cords comprising steel.

7. The method of claim 1, wherein the second inflation pressure is filled into a bladder on the radially inner side of the cylindrical raw tire body.

8. The method of claim 1, wherein an external diameter D2 on an equator of the cylindrical belt ply in the second expanded phase and an external diameter D3 on the equator of the cylindrical belt ply in the third expanded phase are set to have a ratio D2/D3 in a range of 0.90 to 1.00.

9. The method of claim 2, wherein a time for increasing from the first inflation pressure to the second inflation pressure is set in a range of 10 to 30 seconds.

10. The method of claim 2, wherein the pressing down of the edges of the cylindrical belt ply includes bonding the cylindrical belt ply to the cylindrical raw tire body such that an internal diameter Dc on an equator of the cylindrical belt ply after the cylindrical belt ply is bonded to the cylindrical raw tire body by the pressing down is set greater than an external diameter Db of the bell rings, and an internal diameter Ds at an axially peripheral edge of the cylindrical belt ply after the cylindrical belt ply is bonded to the cylindrical raw tire body by the pressing down is set smaller than the external diameter Db of the bell rings.

11. The method of claim 10, wherein the internal diameter Dc on the equator of the cylindrical belt ply, the external diameter Db of the bell rings, and the internal diameter Ds at the axially peripheral edge of the cylindrical belt ply satisfy $0.15 \leq (Db-Ds)/(Dc-Ds) \leq 0.45$.

12. The method of claim 2, wherein the cylindrical belt ply includes the plurality of belt cords comprising steel.

13. The method of claim 2, wherein the second inflation pressure is filled into a bladder on the radially inner side of the cylindrical raw tire body.

14. The method of claim 2, wherein an external diameter D2 on an equator of the cylindrical belt ply in the second expanded phase and an external diameter D3 on the equator of the cylindrical belt ply in the third expanded phase are set to have a ratio D2/D3 in a range of 0.90 to 1.00.

15. The method of claim 3, wherein the pressing down of the edges of the cylindrical belt ply includes bonding the cylindrical belt ply to the cylindrical raw tire body such that an internal diameter Dc on an equator of the cylindrical belt ply after the cylindrical belt ply is bonded to the cylindrical raw tire body by the pressing down is set greater than an external diameter Db of the bell rings, and an internal diameter Ds at an axially peripheral edge of the cylindrical belt ply after the cylindrical belt ply is bonded to the cylindrical raw tire body by the pressing down is set smaller than the external diameter Db of the bell rings.

16. The method of claim 15, wherein the internal diameter Dc on the equator of the cylindrical belt ply, the external diameter Db of the bell rings, and the internal diameter Ds at the axially peripheral edge of the cylindrical belt ply satisfy $0.15 \leq (Db-Ds)/(Dc-Ds) \leq 0.45$.

17. The method of claim 3, wherein the cylindrical belt ply includes the plurality of belt cords comprising steel.

18. The method of claim 3, wherein the second inflation pressure is filled into a bladder on the radially inner side of the cylindrical raw tire body.

19. The method of claim 3, wherein an external diameter D2 on an equator of the cylindrical belt ply in the second expanded phase and an external diameter D3 on the equator of the cylindrical belt ply in the third expanded phase are set to have a ratio D2/D3 in a range of 0.90 to 1.00.

20. The method of claim 4, wherein an external diameter D2 on the equator of the cylindrical belt ply in the second expanded phase and an external diameter D3 on the equator of the cylindrical belt ply in the third expanded phase are set to have a ratio D2/D3 in a range of 0.90 to 1.00.

* * * * *